United States Patent [19]

Molbert

[11] 3,978,011

[45] Aug. 31, 1976

[54] FLAME RETARDANT FLEXIBLE URETHANE FOAMS

[75] Inventor: Robert A. Molbert, Cuyahoga Falls, Ohio

[73] Assignee: The General Tire & Rubber Company, Akron, Ohio

[22] Filed: Jan. 13, 1975

[21] Appl. No.: 540,378

Related U.S. Application Data

[62] Division of Ser. No. 427,880, Dec. 26, 1973, Pat. No. 3,884,849.

[52] U.S. Cl. .................. 260/2.5 AJ; 260/2.5 AB; 260/2.5 AK; 260/2.5 BB; 260/2.5 BE
[51] Int. Cl.² ........................................ C08G 18/08
[58] Field of Search ............... 260/2.5 AJ, 2.5 AK, 260/2.5 AB, 2.5 BB, 2.5 BE

[56] References Cited
UNITED STATES PATENTS

| | | | |
|---|---|---|---|
| 3,006,870 | 10/1961 | Steinfatt et al. | 260/2.5 BB |
| 3,245,923 | 4/1966 | Manzella et al. | 260/2.5 BB |
| 3,255,129 | 6/1966 | Ferrari | 260/2.5 BB |
| 3,574,149 | 4/1971 | Harrington | 260/2.5 AJ |
| 3,738,953 | 6/1973 | Angora et al. | 260/2.5 BE |
| 3,810,851 | 5/1974 | Norman et al. | 260/2.5 BE |
| 3,876,571 | 4/1975 | Cobbledick et al. | 260/2.5 BE |
| 3,931,062 | 1/1976 | Cobbledick | 260/2.5 BE |

FOREIGN PATENTS OR APPLICATIONS

| | | | |
|---|---|---|---|
| 229,612 | 4/1958 | Australia | 260/2.5 BB |
| 1,040,302 | 8/1966 | United Kingdom | 260/2.5 BB |

*Primary Examiner*—Eugene C. Rzucidlo

[57] ABSTRACT

The discoloration occurring during commercial production of large buns or slabs of low density, flexible and semiflexible polyetherurethane foams containing chlorine-containing polymers such as polyvinyl chloride, zinc oxide and antimony oxide, in which optionally part of the chlorine-containing polymer can be replaced with a chlorinated paraffin provided a proportionate reduction is made in the amount of the zinc oxide employed, is reduced or prevented by using a small amount of a zinc salt of an organic monocarboxylic acid or an organic mono dithiocarbamic acid having from 1 to 25 carbon atoms in each acid moiety of said salt.

10 Claims, No Drawings

FLAME RETARDANT FLEXIBLE URETHANE FOAMS

This application is a division of prior copending U.S. Pat. application Ser. No. 427,880, filed Dec. 26, 1973, now U.S. Pat. No. 3,884,849 granted May 20, 1975.

BACKGROUND OF THE INVENTION

When polyvinyl chloride, antimony trioxide, and zinc oxide are added to a low density flexible and semiflexible polyetherurethane flame retardant foam formulation including the usual tertiary amines, water, and metal containing catalysts and the formulation is run on production equipment as commercially used to form buns (loaves or slabs) having, for example, a cross section of about 30 × 76 inches and a length of about 40 feet or more, the foam discolors (dark pin or purple) in the center section of the bun as to be virtually unsalable as is commercially.

The only external heat applied to the bun as it moves down the conveyor is that received when it passes through an oven at a speed of about 5 to 12 feet/min. and at a temperature of about 180°F. for the purpose of reducing or eliminating surface tack so that the outside paper can readily be removed without tearing large chunks from the foam.

At the end of the conveyor the buns are removed and stored for about 24 hours without any external heat being applied to permit the foam to finally cure or stabilize by itself. Then the foam is slit into mattress size units or into other sizes for further manufacturing operations. Even at this time the temperature of the center of the bun is well above room temperature.

The exothermic heat of reaction of the foam forming ingredients during foaming reaches temperatures of from about 270° to 350°F. These temperatures are determined by a pyrometer probe at the end of the conveyor line and can be higher than shown considering that the mass of the pyrometer is greater than that of the surrounding foam.

DISCUSSION OF THE PRIOR ART

U.S. Pat. No. 3,006,870 (1961) discloses that polyurethane foams containing small amounts of zinc dimethyldithiocarbamate are resistant to fungi. U.S. Pat. No. 3,075,928 (1963) is directed to the preparation of flame resistant polyurethane foams containing antimony trioxide and polyvinyl chloride. U.S. Pat. No. 3,182,037 (1965) discloses that polyurethane foams can be stabilized against deterioration on exposure to ultraviolet light by incorporating into the foam ingredients a mixture of titanium dioxide and a metal salt of a diester of dithiocarbamic acid where the metal among others is zinc, for example, zinc dibutyldithiocarbamate. U.S. Pat. No. 3,245,923 (1966) shows that metal dihydrocarbyldithiocarbamates, among others for example zinc dimethyldithiocarbamate, will improve the green strength of polyurethane foams. U.S. Pat. No. 3,255,129 (1966) states that zinc dibutyl, diamyl or dibenzyl dithiocarbamates stabilize polyurethane foams against light discoloration and discoloration by flue gases but are not useful as fungicides in polyurethane foams in contrast to the zinc dimethyl and diethyl dithiocarbamates of 3,006,870 above which protect the polyurethane foam from fungi but provide foams which exhibit poor stability to heat. U.S. Pat. No. 3,347,804 (1967) discloses that a mixture of lead, zinc and tin salts of carboxylic acids such as the naphthenates and octoates may be used as a catalyst for making polyurethane foams. U.S. Pat. No. 3,391,091 (1968) discloses that polyurethane foams can be made using a gel catalyst such as a tin compound and a blowing catalyst which is a soap of Ag, Zn, Cd, Al or Pb, for example, zinc stearate. Low density flame retardant foams containing polyvinyl chloride, antimony trioxide and zinc oxide (French Process) are disclosed by U.S. Pat. No. 3,574,149 (1971). A flame retardant composition for urethane foams comprising an inert filler (staurolite, perlite, silicon dioxide sand, a fused glass composition of antimony trioxide or a combination of antimony trioxide and a borate, aluminum silicate, antimony pentoxide, zircon, barytes or colemanite), a halogen source (chlorinated paraffin, perchloropentacyclodecane, chlorinated polyethylene, polyvinyl chloride or bromophenols), and a phosphorus-containing compound (hydrated calcium phosphate, ammonium phosphate, triphenyl phosphine oxide, tricresyl phosphate and halogenated phosphates) is shown in U.S. Pat. No. 3,635,821 (1972). British Pat. No. 980,139 (1965) discloses that the addition of a zinc salt of a carboxylic acid (zinc octoate) to the catalyzed foam ingredients will provide a polyurethane foam in which the surface drying time is reduced. Published German patent application No. P 23 24 561.6 (1973) discloses flame retardant flexible polyurethane foams containing polyvinyl chloride, zinc oxide and antimony trioxide in which a part of the polyvinyl chloride may be replaced with a chlorinated paraffin provided a reduction is made in the amount of the zinc oxide used. Saunders and Frisch, "Polyurethanes," Chemistry and Technology, Part II, Technology, Interscience Publishers a division of John Wiley & Sons, New York, 1964, on page 23 shows that zinc naphthenate may be a catalyst for flexible polyurethane foams and on pages 200, 223 and 224 states that antimony oxide, antimony trioxide, zinc oxide, zinc stearate, zinc laurate and halogenated aliphatic hydrocarbons, among others, may be added to rigid polyurethane foam formulations to impart flame retardancy.

However, these references do not suggest nor show how to prevent discoloration of flexible and semiflexible low density polyurethane foams which are rendered flame retardant by the use of ZnO, $Sb_2O_3$ and a chlorine containing solid resin.

Accordingly, it is a primary object of this invention to avoid the difficulties alluded to above, and to provide flexible and semiflexible polyetherurethane flame retardant low density foams containing halogen containing polymers, antimony trioxide, and zinc oxide and which exhibit resistance to or freedom from discoloration after foaming and to provide a method for making the same.

These and other objects and advantages of the present invention will become more apparent to those skilled in the art from the following detailed description and example.

SUMMARY OF THE INVENTION

According to the present invention it has now been discovered that the addition of a small amount of a zinc salt of an organic monocarboxylic acid or an organic dithiocarbamic acid having from 1 to 25 carbon atoms in each acid moiety of said salt to a commercial bun or slab flexible and semiflexible polyetherurethane foam formulation, prior to the blowing thereof into a foam, and also containing finely divided zinc oxide, antimony trioxide, a chlorine-containing solid polymer and optionally a chlorinated paraffin wherein the chlorinated paraffin is used to replace part of the chlorine-containing polymer and wherein the amount of the zinc oxide is reduced in proportion to the reduction in the chlorine-containing polymer, will provide foams in which the discoloration is reduced or substantially reduced.

DISCUSSION OF DETAILS AND PREFERRED EMBODIMENTS

The zinc salt used in the practice of the present invention is selected from the group consisting of zinc salts of organic monocarboxylic acids and organic mono dithiocarbamic acids having from 1 to 25 carbon atoms in each acid moiety of said salt. Preferably, the monocarboxylic acid zinc salts employed have the formula

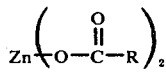

where R can be the same or different and represents a hydrocarbon group, typically an aliphatic or cycloaliphatic group such as alkyl, alkenyl, etc., and corresponding cyclic groups such as cycloalkyl, etc. groups; an aryl group such as phenyl, substituted phenyls, naphthyl, etc.; an aralkyl group such as benzyl, styryl, cinnamyl, etc.; an alkaryl group such as tolyl, xylyl, etc.; a cycloaliphatic group such as a naphthenic group; etc. having from 1 to 20 carbon atoms. Other equivalent groups may be employed. Typical of the acids from which the salts or soaps may be prepared may be acetic acid, propionic acid, butyric acid, caproic acid, caprylic acid, capric acic, stearic acid, oleic acid, etc. Naphthenic acid may be employed. The commercially-occurring mixture of acids known as tall oil fatty acids may be employed including rosin acid, rosin and rosin derivatives, 2-ethyl hexoic acid, synthetic tertiary acids, abietic type acids, primaric type acids and the like. Mixtures of acids can be used.

Also, preferably, the zinc salts of the mono dithiocarbamic acids have the formula

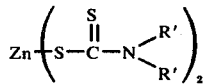

where R' can be the same or different and is an alkyl, aryl, alkaryl, aralkyl, or cycloaliphatic radical having from 1 to 12 carbon atoms. These compounds are well known as shown by the above U.S. Pat. Nos. 3,182,037; 3,245,923; and 3,391,091 and British Pat. No. 980,139. Please, also, see "Encyclopedia Of Chemical Tehnology," Kirk-Othmer, 2nd Ed., Vol. 7, 1965, Interscience Publishers a Division of John Wiley & Sons, Inc., New York, pages 272 to 287; and "Encyclopedia Of Polymer Science And Technology," Vol. 5, 1966, Interscience Publishers a Division of John Wiley & Sons, Inc., New York, pages 126–139. While dithiocarbamic acids do not apparently exist in the free state, it is convenient to speak of these particular zinc salts as salts of dithiocarbamic acids. They can readily be prepared from zinc hydroxide, carbon disulfide and an amine, for example,

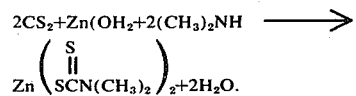

See "The Chemistry Of Organic Compounds," Conant and Blatt, 3rd Ed., 1947, The MacMillan Company, New York, page 349 and "The Merck Index," 7th Edition, 1960, Merck & Co., Inc., Rahway, N.J., page 1119.

Some specific examples of these zinc salts to employ are zinc acetate, zinc propionate, zinc benzoate, zinc butyrate, zinc caproate, zinc caprylate, zinc palmitate, zinc stearate, zinc linoleate, zinc oleate, zinc ricinoleate, zinc caprate, zinc laurate, zinc behenate, zinc undecylenate, zinc valerate, zinc naphthenate, zinc 2-ethyl hexoate, zinc dimethyldithiocarbamate, zinc diethyldithiocarbamate, zinc dibutyldithiocarbamate, zinc diamyldithiocarbamate, zinc dioctyldithiocarbamate, zinc didecyldithiocarbamate, zinc diphenyldithiocarbamate, zinc ditolyldithiocarbamate, zinc dibenzyldithiocarbamate, zinc dinaphthyldithiocarbamate, and the like and mixtures thereof. Some of these zinc salts may contain water of crystallinity or hydration which may be removed prior to use. Likewise some of these compounds like zinc ricinoleate may contain a hydroxyl group bound to a carbon atom. If the water of crystallinity is not removed and a zinc ricinoleate type compound is used, such hydroxyl content may be taken into account in computing the amount of polyisocyanate required for foaming. Preferred salts are those which are solid and finely divided.

The amount of the zinc salt to use will vary from about 0.01 to 0.90 part by weight computed as metallic zinc per 100 parts by weight of the total polyol used in the foam formulation.

The flame retardant polyurethane foaming composition or formulation must contain per 100 parts by weight of the organic polyol, as flame retardant ingredients from about 0.1 to 10 parts, preferably from about 0.2 to 5 parts, of zinc oxide, from about 0.5 to 15 parts, preferably from about 1 to 10 parts, of antimony trioxide ($Sb_2O_3$) and the chlorine-containing polymers as described below.

The chlorine-containing solid polymers employed herein include polymers, usually resinous in character, of vinyl chloride and vinylidene chloride and mixtures of these monomers as well as copolymers of a predominating molar amount of one or more of these monomers and a minor molar amount of vinyl acetate, acrylonitrile, methacrylonitrile, dimethyl or diethyl maleate or fumarate, methyl acrylate, methyl methacrylate, ethyl ethacrylate, vinyl stearate and the like and mixtures thereof. Still other halogen-containing resins can be used such as hydrolyzed or partially hydrolyzed copolymers of a major molar amount of vinyl chloride and a minor amount of vinyl acetate. Moreover, other resinous polymers can be used such as chlorinated rubber, chlorinated polyethylene, chlorinated polyvinyl chloride and the like. Mixtures of the chlorine-containing polymeric resins can be used.

These chlorine-containing polymeric resins should be finely divided (powders having average particle sizes of from about 0.00001 to 1 mm.) and have an intrinsic viscosity of from about 0.25 to 2.5, preferably from about 0.5 to 1.5. The chlorine-containing resinous polymers are generally used in an amount of from about 1 to 50 parts by weight per 100 parts by weight of the polyol, preferably from about 2 to 25 parts by weight. The larger particle size resins can be used in larger amounts within the given ranges. However, the finer or smaller particle size resins should be used in smaller amounts within the ranges shown to avoid the formation of viscous, difficult to pump or stir, fluids, gels or pastes. The chlorine-containing polymers can be made by bulk, solvent, emulsion or suspension polymerization process. A preferred polymer to use is polyvinyl chloride which has been prepared by emulsion polymerization. An added advantage in some cases in using these resins is an increase in the load bearing properties of the foam.

Optionally, part of the chlorine-containing polymeric resin used in the foam formulation can be replaced with a chlorinated paraffin or with mixtures of chlorinated paraffins. These materials are made by the chlorination of liquid paraffin fractions and/or paraffin waxes. The chlorinated paraffins have average molecular weights of from about 250 to 1400 and chlorine contents of from about 40 to 70% by weight. They can be liquids or solids; preferably the liquid (at room temperature, 20° to 30°C.) chlorinated paraffins are employed in the practice of the present invention. Also, it is preferred that the chlorinated paraffins be odor-free or substantially odor-free. Examples of chlorinated paraffins are the Cereclor (I.C.I. America, Inc.) chlorinated paraffins Nos. 42, S.45, S.52, and 70, and the Chlorowax (Diamond Shamrock Chemical Company) chlorinated paraffins Nos. 40, 50 and 70. Still other chlorinated paraffins can be used. The chlorinated paraffin is used in an amount by weight sufficient to replace from about 5 to 80% by weight of the chlorine-containing polymeric resin on essentially a percent by weight chlorine (Cl) basis. For example, based on 100 parts by weight of polyol in a given formulation, if 20 parts by weight of polyvinyl chloride (about 75% by weight of chlorine — Cl) containing 11.40 parts of chlorine is reduced to 10 parts by weight of PVC in the formulation, a chlorinated paraffin containing 42% by weight of chlorine (Cl) should be added in an amount of about 13.7 parts by weight (to provide a total chlorine content of 11.45 parts by weight). Similar adjustments can be made with other chlorine-containing polymeric resins and other chlorinated paraffins.

The zinc oxide should be finely divided, for example, it should have an average particle size of from about 0.05 to 200 microns, preferably from about 0.15 to 50 microns. It should not contain any appreciable amount of impurities which would adversely affect the foaming reaction or the properties of the resulting foams. The zinc oxide may be American process zinc oxide, French process zinc oxide, or zinc oxides produced by other processes. Zinc oxide is a well known material and is shown by:

A. "Encyclopedia Of Chemical Technology," Kirk and Othmer, The Interscience Encyclopedia, Inc., New York, Vol. 15, 1956, pages 262–266;
B. "Zinc," Mathewson, Reinhold Publishing Corporation, New York, 1959, pages 346 to 385; and
C. "Compounding Ingredients For Rubber," Third Edition, 1961, Rubber World, New York, pages 65, 72, 77, 80, 81 and 88.

When part of the chlorine-containing polymeric resin is replaced with a given amount of the chlorinated paraffin, the amount of zinc oxide should be reduced by a proportionate amount essentially equivalent to the amount of polymer eliminated. For example, where 5% by weight of the chlorine-containing polymeric resin is replaced with the chlorinated paraffin, then the amount of zinc oxide normally employed should be reduced by about from 4 to 7%, usually 5%, by weight. Where the amount of the chlorine-containing polymeric resin is reduced by 50% by weight (and replaced with an essentially equivalent amount of the chlorinated paraffin on a chlorine basis), the amount of zinc oxide used should be reduced by about 50% by weight.

The antimony trioxide, also, should be finely divided, for example, it should have an average particle size of from about 0.05 to 200 microns, preferably from about 0.15 to 50 microns. It should not contain any deleterious materials which would adversely affect the foaming reaction or the properties of the resulting foam. The smaller particle sizes of antimony trioxide are most effective in the foam.

Polyols used in making the polyurethanes of the present invention are generally primary and secondary hydroxy-terminated polyoxyalkylene ethers having from 2 to 4 hydroxyl groups and a molecular weight of from about 1,000 to 10,000. They are liquids or are capable or being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polypropylene glycols, the polypropylene-ethylene glycols, and the polybutylene ether glycols. Polymers and copolymers of alkylene oxides are also adaptable in the process of this invention as well as the block copolymers of ethylene oxide and propylene oxide and the like. Among the polymers and copolymers that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3, glycerol, 1,2,6-hexanetriol, trimethylolpropane, trimethylolethane, pentaerythritol, triethanolamine, triisopropanolamine, ethylenediamine, and ethanolamine. Linear and branched copolyethers of other alkylene oxides are also useful in making the foamed products of this invention as well as the polypropylene diols, triols and tetrols end-blocked with ethylene oxide to provide primary hydroxyl groups in the polymer and having molecular weights of from about 2000 to 5000.

Examples of useful types of polyetherpolyols are characterized by reference to the following general formulae:

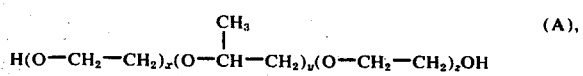

(A), and

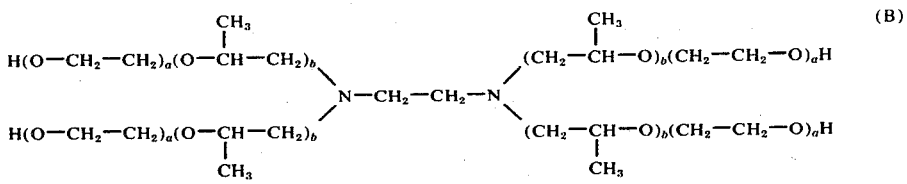

where in Formula A the total of subscripts, $x$, $y$, and $z$ represent positive integers in the range of from 20 to 70 and the total of subscripts $a$ and $b$ of Formula B represent positive integers in the range of from 20 to 100.

Branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer. Mixtures of polyether polyols can be used.

Likewise, there can be used as polyols grafts of ethylenically unsaturated monomers such as acrylonitrile, methacrylonitrile, vinyl acetate, methyl acrylate and the like on the polyols and having the functionality and molecular weight as shown above. Such graft polyols and methods for making the same are shown in U.S. Pat. (to Stamberger) Nos. 3,304,273 and 3,383,351 and in U.S. Pat. to Von Bonin, No. 3,294,711 where the monomer or monomers are polymerized with a free-radical or other catalyst in admixture with the polyol.

When desired, cross-linking materials having from 2 to 8 hydroxyl groups can be included in the foam formulation to increase cross link density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, glycerol, trimethylolpropane, butane triols, hexanetriols, trimethylolphenol, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of poly-functional compounds having three or more reactive hydrogen atoms, such as, for example, the reaction product of trimethylolpropane, glycerol, 1,2,6-hexanetriol, sorbitol and other polyols with ethylene oxide, propylene oxide, or other alkylene epoxides or mixtures thereof, e.g., mixtures of ethylene and propylene oxides. Grafted crosslinkers can be prepared by the process of the aforementioned Stamberger and Von Bonin U.S. Patents. Mixtures of crosslinkers can be used. All of the polymer-forming ingredients should preferably be free of any amine function which is not sterically hindered or shielded.

Any organic di- or tri- isocyanate can be used in the practice of the present invention. Diisocyanates are preferred, particularly when there is any considerable amount of branching in the polyol or crosslinker to avoid the formation of rigid or semi-rigid foams. Examples of suitable organic polyisocyanates to use are ethylene diisocyanate, trimethylene diisocyanate, tetramethylene diisocyanate, pentamethylene diisocyanate, hexamethylene diisocyanate, propylene-1,2-diisocyanate, butylene-1,2-diisocyanate, butylene-1,3-diisocyanate, butylene-2,3-diisocyanate, alkylidene diisocyanates such as ethylidine diisocyanate and butylidine diisocyanate; cycloalkylene diisocyanates such as cyclopentylene-1,3-diisocyanate, cyclohexylene-1,2-diisocyanate, cyclohexylene-1,3-diisocyanate, and cyclohexylene-1,4-diisocyanate; cycloalkylidene diisocyanates such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4,-tolylene diisocyanate, 2,6-tolylene diisocyanate, bitolylene diisocyanate, naphthalene-1,4-diisocyanate, and diphenylene-4,4'-diisocyanate; aliphatic-aromatic diisocyanates such as xylylene-1,4-diisocyanate, xylylene-1,3-diisocyanate, bis(4-isocyanatophenyl) methane, bis (3-methyl-4-isocyanatophenyl) methane, and 4,4'-diphenylpropane diisocyanate, durene diisocyanate, 4,4', 4''-tris (isocyanatophenyl) methane, 3,10-diisocyanatotricyclo[5.2.1.0$^{2,6}$] decane, bis-(2-isocyanatoethyl) carbonate, and naphthalene triisocyanate and the like. Mixtures of polyisocyanates can be used.

The polyisocyanate is used in an amount sufficient to react with the active hydrogen atoms (as determined by the Zerewitinoff method, J.A.C.S., Vol. 49, p. 3181 (1927)) in the polyols, crosslinkers, water, chlorine-containing polymeric resins (such as partially hydrolyzed vinyl chloride-vinyl acetate copolymers) and any other active hydrogen-containing material in the polyurethane foam formulation to provide the desired degree of cross-linking, chain extension, urea groups, blowing and so forth to obtain the desired flexibility, strength and other physical properties.

Water is used as a blowing agent and is employed in amounts of from about 1.0 to 6.5 parts by weight per 100 parts by weight of the polyol.

The water should be substantially or essentially pure, that is, it should be free of impurities such as ions, sols, etc. of mineral, vegetable or synthetic origin and the like which would adversely affect the foaming action or the properties of the resultant polyurethane foam. Deionized, distilled or otherwise purified water should be employed.

If lower density and softer foams are desired there additionally can be added to the polyurethane foam formulation separately or in admixture with one of the other components, i.e., polyol or polyisocyanate, etc., up to about 25 parts by weight of a fluorocarbon blowing agent per 100 parts by weight of the polyol. Examples of such blowing agents are those fluorine substituted aliphatic hydrocarbons which have boiling points between about −40°C. and +170°C., and which vaporize at or below the temperature of the foaming mass. The blowing agents include, for example, trichloromonofluoromethane, dichlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chloro-nona-fluorobutane, hexafluorocyclobutene, and octafluorocyclobutane. Still other easily vaporizable fluorocarbons can be used. Mixtures of the fluorocarbons can be used. Still other blowing agents can be used in full or partial replacement of the flurocarbons such as propane, butane, pentane, pentene, hexane and so forth, and mixtures thereof, particularly where precautions are taken to prevent explosions or where removal of the gasses is provided. See U.S. Pat. Nos. 3,072,582 and 3,391,093.

Catalysts for the polyetherpolyol-polyisocyanate reaction can be any catalyst heretofore used in the art particularly the metal-containing catalysts. Examples of such catalysts are (1) tertiary phosphines such as trialkylphosphines, dialkyl-benzylphosphines, and the like; (2) strong bases such as the alkali and alkaline earth metal hydroxides, alkoxides, and phenoxides; (3) acidic metal salts of strong acids such as stannic chloride, stannous chloride, antimony trichloride, bismuth nitrate, bismuth chloride, and the like; (4) alcoholates and phenolates of various metals such as Ti(OR)$_4$, Sn(OR)$_4$, Sn(OR)$_2$, Al(OR)$_3$, and the like, wherein R is alkyl or aryl, and the reaction products of alcoholates with carboxylic acids, beta-diketones and 2-(N,N-dialkylamino) alkanols, such as the well known chelates of titanium obtained by said or equivalent procedures; (5) salts of organic acids with metals such as alkali metals, alkaline earth metals, Al, Sn, Pb, Mn, Co, Bi, Sb, Ni, and Cu, including, for example, sodium acetate, potassium laurate, calcium hexanoate, stannous acetate, stannous octoate, stannous oleate, lead octoate, antimony trineodecanoate, antimony trioleate, bismuth trineodecanoate, metallic driers such as manganese, cobalt, and lead naphthenate and the like; (6) organometallic derivatives of tetravalent tin, trivalent and pentavalent As, Sb, and Bi, and metal carbonyls of iron and cobalt; and (7) the dialkyltin salts of carboxylic acids, e.g., dibutyltin diacetate, dibutyltin dilaurate, dibutyltin maleate, dilauryltin diacetate, dioctyltin diacetate, dibutyltin-bis (4-methylaminobenzoate), dibutyltin-bis(6-methylaminocaproate), and the like; as well as a trialkyltin hydroxide, dialkyltin oxide, dialkyltin dialkoxide, or a dialkyltin dichloride, such as trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis (2-methylaminopentylate), dibutyltin dichloride, dioctyltin dichloride, and the like and mixtures thereof. Preferred catalysts to use are the divalent tin salts of carboxylic acids having from 2 to 18 carbon atoms. These catalysts are used in an amount of from about 0.1 to 0.9 part by weight per 100 parts by weight of the polyetherpolyol. It is less preferable to use those catalysts, such as the metal salts, alcoholates, hydroxides, alkoxides and phosphines, especially in large amounts, where resins containing ester groups in a substantial amount are used since they tend to hydrolyze the ester linkages thereby causing scission of the backbone polymer chain and lowering of the physical and chemical properties of the resultant foams and so forth, especially under conditions of high temperature and humidity.

Surfactants or emulsifiers are generally necessary to provide the desired cell formation and growth. Polysiloxane-polyoxyalkylene block copolymers are preferred. Polysiloxane-polyoxyalkylene block copolymers are described in U.S. Pat. Nos. 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Still other polysiloxane-polyoxyalkylene copolymers known to the art may be employed as well as silicones, turkey red oil and so forth. The surfactant is used in an amount of from about 0.3 to 2.5 parts by weight per 100 parts by weight of the polyether polyol.

It is advantageous to incorporate into the urethane compositions of the present invention at least one organic tertiary amine catalyst, preferably together with a metal-containing co-catalyst. The amount of organic amine catalyst may comprise, per 100 parts by weight of organic polyol, about 0.05 to 3.2 parts by weight. In the case of the polyether polyols where a metal catalyst is used for the urethane-forming reaction, it is preferred to use only from about 0.05 to 1.1 part by weight of the amine. On the other hand, where the tertiary amine is taking care of both the foaming (H$_2$O+NCO) and network (—ROH+NCO) reactions, the tertiary amines should be used in somewhat larger amounts within the specified ranges. However, since some polyols may differ in residual acid content (from neutralization of KOH catalyst (used to form polyol) with acid) due to the incomplete washing, filtering or ion-exchanging of the neutralized polyol and since antimony trioxide has some catalytic effect during the polyurethane foaming and forming reactions, the amount of tertiary amine may necessarily have to be reduced where large amounts of water are used as the primary blowing agent.

In the urethane compositions of the invention there may be used a wide variety of organic tertiary amine catalysts. Such organic amines, include, among others, triethylene diamine, triphenyl amine, triethylamine, N,N, N', N'-tetramethyl-1,3-butane diamine, N-methyl morpholine, N-ethyl morpholine, N-acetyl morpholine, N-octyl morpholine, N-coco morpholine, N-phenyl morpholine, N-hydroxyl ethyl morpholine, N-hydroxyl methyl morpholine, 4,4'-dithiodimorpholine, dimethyl piperazine, N,N,N'N'-tetramethyl propane diamine, trimethyl aminoethyl piperazine, N,N-dimethyl ethanolamine, dimethyl hexadecylamine, 1-(2-ethyl-1-hexenyl) piperazine, tri-n-octylamine, tri-methylamine, N,N-dimethyl benzyl amine, triethanolamine, 1,2,4-trimethylpiperazine, N-methyl dicyclohexylamine, and mixtures thereof. The sterically hindered organic tertiary amines, such as methyl dicyclohexylamine, especially those disclosed in U.S. Pat. No. 3,718,611, also, can be employed in the foam formulations if desired.

Other well known constituents can be added to the polyurethane foam recipe such as clay, talc, $TiO_2$, silica and hydrated silica, $CaCO_3$, metal chromates, barytes, phthalocyanine green or blue pigments, conventional stabilizers, carbon black, dyes, toners, extending oils, processing oils, epoxided soybean oil (Paraplex G-62), epoxides (Epon 828), tricresyl phosphate, plasticizers, antioxidants, fungicides, bacteriostats, deodorants and the like. These constituents can be added in various amounts to the foaming ingredients to achieve the desired properties in the resultant flexible, low density foams.

The flexible and semiflexible, cellular urethane polymeric foams of the present invention can be used as cushions, mattresses, pillows, packing, cushioning material for furniture, automobiles, rug underlay, interior automobile and other vehicle door panels, seats, arm rests, head rests, and so forth.

The preparation of the polyurethane foams of the present invention can be formed by a process known in the art as the "one-shot" process or by a two step process involving, first, the preparation of a "prepolymer", the well known "semiprepolymer" or "quasi-prepolymer" technique. There all or a portion of the polyol is reacted with all of the organic polyisocyanate, providing a reaction product which contains a high precentage of free isocyanate groups and which is reacted with the remaining portion of the hydroxyl-terminated polyol or a crosslinker, together with water, catalysts, the zinc salt, the metal oxides, the chlorine-containing polymeric resin and chlorinated paraffin to form a rubbery, cellular, elastic product.

No matter which particular technique is used, the zinc salt, the chlorine-containing polymeric resin, zinc oxide, antimony trioxide and/or chlorinated paraffin may not only be dispersed with the polyol alone, but alternatively with the organic polyisocyanate alone. Still another method within the purview of the present invention involves dispersing these ingredients with a combination of the polyol and the organic polyisocyanate. In any case, it is advantageous to disperse these ingredients thoroughly into whatever particular initial composition is used.

The purple color developed in the polyetherurethane foam bun or slab during production may be caused by some interaction between the polyvinyl chloride and the amines present during the foam formation either present as catalysts (tertiary) per se or as amines (primary or secondary) momentarily present and produced from the isocyanate-water reaction which provides carbon dioxide for blowing. The color formation in the bun, also, is apparently enhanced by the exotherm produced during blowing and urethane/urea formation and by the retention for some period of time of elevated temperatures in the center of the bun due to the insulating nature of the mass of the bun itself. Moreover, while certain amines (primary, secondary and tertiary) have been disclosed as stabilizers or antioxidants for polyvinyl chloride, it is stated that zinc oxide can not ordinarily be used with vinyl chloride polymers. "Vinyl And Related Polymers," Schildknecht, John Wiley & Sons, Inc., New York, 1952, pages 422 and 423 and "Modern Plastics Encyclopedia," Vol. 46, No. 10 A, October, 1969, McGraw-Hill, Inc., New York, pages 1011 and 1016. Accordingly, the discoloration or degree of discoloration may be related to a number of factors including amount of the polyvinyl chloride, amount of amine, zinc oxide, exotherm temperature and so forth.

On the other hand, the present invention shows that by the use of certain zinc salts in certain amounts the discoloration can be prevented or substantially reduced in production foam buns or slabs of flame retardant polyetherurethane foam containing polyvinyl chloride or other chloride containing polymeric resin, antimony trioxide and zinc oxide. While the exact mechanism for preventing discoloration is unknown, it is postulated that upon the exothermic heat developed during reaction or by heat applied the zinc salts melt, decompose or emit vapors within the bun and intermix with the hot products of the urethane-urea-water reaction to prevent such products or even by-products from interacting with the ingredients of the foam during reaction to cause discoloration of the foam.

The following example will serve to illustrate the present invention with more particularity to those skilled in the art.

EXAMPLE

Polyvinyl chloride, antimony trioxide, zinc oxide, the additive and about 50% by weight of the polyalkylene ether triol were mixed together in a Cowles mixer for 30 minutes to form a premix. Then the silicone surfactant, water, tin catalyst, tertiary amine catalysts, the remainder of the polyol were added to the premix and mixed together. Finally, the tolylene diisocyanate was added to the resulting mixture which was allowed to rise in a 1 gallon container and immediately placed in an air oven at 300°F. for 5 hours (because of the small bun size prepared in the laboratory practically no discoloration would occur if the buns were not placed in the 300°F. oven). The ingredients of the foam formulations are shown in Table I, and the results obtained using various zinc and other metal compounds are shown in Table II, below:

TABLE I

| Ingredient | Parts By Weight |
| --- | --- |
| Poly G 3030 PG (1) | 100. |
| L-540 Silicone (2) | 1.0 |
| T-9 (3) | 0.3 |
| Water (deionized) | 4.0 |
| Polycat 12 (4) | 0.1 |
| Dabco 33 LV (5) | 0.01 |
| Geon 121 (6) | 15.0 |
| Antimony trioxide, finely divided | 7.0 |
| Zinc oxide, French process, finely divided | 2.8 |
| Additive | varied |
| Tolylene diisocyanate, 80/20, 2,4/2,6- | 50.0 |

TABLE II

| Run No. | Additive | Parts By Wt. Of Additive per 100 p.b.w. Of The Polyol | Color Of Foam Or Other Characteristic Of Foam |
| --- | --- | --- | --- |
| 1 | — | — | Dark Purple |
| 2 | Barium-zinc powder (7) | 1.0 | Dark Purple |
| 3 | Barium-zinc liquid (8) | 1.0 | Dark Purple |
| 4 | Barium-zinc liquid (9) | 1.0 | Dark Purple |
| 5 | Barium-tin liquid (10) | 1.0 | Dark Purple |
| 6 | Barium-cadmium zinc powder (11) | 0.5 | Brownish Orange |

TABLE II-continued

| Run No. | Additive | Parts By Wt. Of Additive per 100 p.b.w. Of The Polyol | Color Of Foam Or Other Characteristic Of Foam |
|---|---|---|---|
| 7 | " | 1.0 | Very light orange-yellow |
| 8 | " | 2.0 | Off white, very slight discoloration. Reduced tensile strength, tear strength and elongation as compared to Run No. 1. |
| 9 | " | 4.0 | White, no visible discoloration. Same reduced physicals as Run No. 8. |
| 10 | Barium-cadmium-zinc powder (12) | 0.5 | Same results as Run No. 6. |
| 11 | " | 1.0 | Same results as Run No. 7. |
| 12 | " | 2.0 | Same results as Run No. 8. |
| 13 | " | 4.0 | Same results as Run No. 9. |
| 14 | Barium-cadmium powder (13) | 1.0 | Purple |
| 15 | Cadmium stearate powder (14) | 1.0 | Dark Purple |
| 16 | Barium-cadmium powder (15) | 1.0 | Light Purple |
| 17 | Barium-cadmium powder (16) | 1.0 | Dark Purple |
| 18 | Zinc stearate | 0.5 | Very light orange-yellow |
| 19 | " | 1.0 | Off white, very slight discoloration |
| 20 | " | 2.0 | White, no visible discoloration, Reduced tensile strength, tear strength and elongation as compared to Run No. 1. |
| 21 | " | 4.0 | " |
| 22 | Magnesium stearate | 1.0 | Dark Purple |
| 23 | Calcium stearate | 1.0 | " |
| 24 | Stearic acid | 1.0 | Light Purple |
| 25 | Zinc carbonate | 1.0 | Dark Purple |
| 26 | Zinc oxide | 1.0 | Dark Purple |
| 27 | Zinc acetate | 1.0 | White |
| 28 | Zinc acetyl acetonate | 1.0 | White. Excessive foam shrinkage. |
| 29 | Zinc oxalate | 1.0 | Purple |
| 30 | Zinc caprylate | 1.0 | Very slight pink. |
| 31 | Zinc dimethyl dithiocarbamate | 1.0 | White |
| 32 | Zinc diethyl dithiocarbamate | 1.0 | White |
| 33 | Metallic zinc, powder, finely divided | 1.0 | Light Purple |
| 34 | Zinc hydroxide | 1.0 | Orange-yellow |
| 35 | Cadmium - zinc powder (17) | 1.0 | Purple |
| 36 | Barium stearate (18) | 1.0 | Dark Purple |

A number of the foams of the Runs of Table II, above, were tested as to flammability according to ASTM-D-1692-68 and the results of the tests are shown in Table III, below:

TABLE III

| Run No. | Burn Length (Inches) | Burn Time (Seconds) | Flammability |
|---|---|---|---|
| 1 | 1⅛ | 31 | Self-extinguishing |
| 19 | 1⅞ | 41 | " |
| 30 | 1⅝ | 53 | " |
| 32 | 2⅝ | 75 | " |
| 27 | 1¾ | 43 | " |

In the foregoing ASTM-D-1692-68 test a Bunsen burner flame having a blue cone of 1.5 inches in height is applied separately to the front edge of the foam test specimens (6 inches by 2 inches by 0.5 inch) and allowed to remain in contact therewith for a period of 60 seconds or until the one inch bench mark is reached. The "self-extinguishing time" is measured in seconds, and the "distance burned" is considered the furthermost point reached by the flame.

Notes:
1. Propylene oxide adduct of glycerol, secondary hydroxyl triol, 3000 m.w., approximate analysis: OH No. 56.3, Acid No. 0.038, $H_2O$ 0.018%, Olin Corporation.
2. Polysiloxane-polyoxyalkylene block copolymer, surfactant, Union Carbide.
3. Stannous Octoate in a carrier; 1 part of stannous octoate in 2 to 4 parts of dioctyl phthalate. The figure shown in the column is for the stannous octoate per se. M & T Chemicals Inc.
4. Methyl dicyclohexyl amine. Abbott Laboratories, Chemical Marketing Division.
5. 33% by weight of triethylene diamine in dipropylene glycol, Houdry Process Corp., dry weight.
6. Emulsion polymerized polyvinyl chloride resin, intrinsic viscosity of about 1.28, 100% through 200 mesh screen, The B. F. Goodrich Company.
7. Synpron F-13, Synthetic Products Company, Division of Dart Industries
8. Synpron 744, Ditto
9. Synpron 940, Ditto
10. Synpron 1012, Ditto
11. Synpron 1307, Ditto Metallic composition of additive, approximately, by weight: Barium 2.8% min., cadmium 5.5% min., and zinc 2.5-3%.
12. Synpron F-66, Ditto Metallic composition of additive, approximately, by weight: Barium 2.8% min., cadmium 5.5% min., and zinc 2.5-3%.
13. Mark 611, Argus Chemical Corporation
14. Synpron P204, Synthetic Products Company
15. Vanstay 4030, R. T. Vanderbilt Company
13. Mark 611, Argus Chemical Corporation
14. Synpron P204, Synthetic Products Company
15. Vanstay 4030, R. T. Vanderbilt Company
16. Mark 686, Argus Chemical Corporation
17. Synpron 76, Synthetic Products Company
18. Vanstay HTB, R. T. Vanderbilt Company

What is claimed is:
1. In the production of a flexible or semi-flexible low density, flame retardant polyurethane foam using the one-shot or prepolymer process by the reaction of (A) a polyetherpolyol having from two to four hydroxyl groups and having a molecular weight of from about 1,000 to 10,000, (B) an organic polyisocyanate and (C) a blowing agent comprising water in admixture with (D) a surfactant, (E) a catalyst, (F) from about 1 to 50 parts by weight per 100 parts by weight of said polyol of a finely divided, solid chlorine-containing polymeric resin having an intrinsic viscosity of from about 0.25 to 2.5, (G) finely divided zinc oxide in an amount of from about 0.1 to 10 parts by weight per 100 parts by weight of said polyol, and (H) finely divided antimony trioxide in an amount of from about 0.5 to 15 parts by weight per 100 parts by weight of said polyol, the improvement comprising incorporating in said formulation prior to foaming a zinc salt of an organic mono dithiocarbamic acid, said salt having from 1 to 25 carbon atoms in each acid moiety of said salt, and said salt being used in an amount of from about 0.01 to 0.90 part by weight, computed as metallic zinc, per 100 parts by weight of total polyol, to prevent or reduce discoloration of said foam during the production of the same.

2. The method according to claim 1 wherein said formulation contains additionally a chlorinated paraffin having an average molecular weight of from about 250 to 1400 and containing from about 40 to 70% by weight of chlorine, wherein said chlorinated paraffin is used in an amount by weight sufficient to replace from about 5 to 80% by weight of said chlorine-containing polymeric resin on essentially a percent by weight chlorine (Cl) basis, and wherein the percent by weight of said zinc oxide is essentially proportionally reduced in accordance with the reduction in the percent by weight of said chlorine-containing polymeric resin.

3. The method according to claim 1 where said zinc salt of an organic mono dithiocarbamic acid has the formula

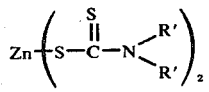

where R' can be same or different, has from 1 to 12 carbon atoms, and is selected from the group consisting of alkyl, aryl, alkaryl, aralkyl and cycloaliphatic groups.

4. The method according to claim 3 where said salt is zinc dimethyl dithiocarbamate.

5. The method according to claim 3 where said salt is zinc diethyl dithiocarbamate.

6. A low density, flexible or semi-flexible flame retardant polyetherurethane foam, the ether moieties of said foam being derived from polyether polyols having a molecular weight of from about 1,000 to 10,000 and having from 2 to 4 hydroxyl groups containing, based on 100 parts by weight of said polyol, (I) from about 1 to 50 parts by weight of a finely divided, solid chlorine containing polymeric resin having an intrinsic viscosity of from about 0.25 to 2.5, (II) finely divided zinc oxide in an amount of from about 0.1 to 10 parts by weight, and (III) finely divided antimony trioxide in an amount of from about 0.5 to 15 parts by weight, the improvement wherein said foam contains additionally during its preparation (IV) a zinc salt of an organic mono dithiocarbamic acid, said salt having from 1 to 25 carbon atoms in each acid moiety of said salt, and said salt being used in an amount of from about 0.01 to 0.90 part by weight, computed as metallic zinc, to prevent or reduce discoloration of said foam.

7. A foam according to claim 6 containing additionally a chlorinated paraffin having an average molecular weight of from about 250 to 1400 and containing from about 40 to 70% by weight of chlorine, wherein said chlorinated paraffin is used in an amount by weight sufficient to replace from about 5 to 80% by weight of said chlorine-containing polymeric resin on essentially a percent by weight chlorine (Cl) basis, and wherein the percent by weight of said zinc oxide is essentially proportionally reduced in accordance with the reduction in the percent by weight of said chlorine-containing polymeric resin.

8. A foam according to claim 6 where said zinc salt of an organic mono dithiocarbamic acid has the formula

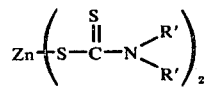

where R' can be same or different, has from 1 to 12 carbon atoms, and is selected from the group consisting of alkyl, aryl, alkaryl, aralkyl and cycloaliphatic groups.

9. A foam according to claim 8 where said salt is zinc dimethyl dithiocarbamate.

10. A foam according to claim 8 where said salt is zinc diethyl dithiocarbamate.

* * * * *